(12) United States Patent　(10) Patent No.: US 12,556,770 B2
Eivy et al.　(45) Date of Patent: Feb. 17, 2026

(54) MULTI-VARIANT CONTENT STREAMING

(71) Applicant: Disney Enterprises, Inc., Burbank, CA (US)

(72) Inventors: Adam D. Eivy, Vashon, WA (US); Dionysius Mavromatis, Kirkland, WA (US); Katharine H. Ham, Charleston, SC (US); Eliza D. McNair, West Hartford, CT (US); Christiaan A. Cokas, Chester, CT (US)

(73) Assignee: Disney Enterprises, Inc., Burbank, CA (US)

( * ) Notice: Subject to any disclaimer, the term of this patent is extended or adjusted under 35 U.S.C. 154(b) by 101 days.

(21) Appl. No.: 17/963,837

(22) Filed: Oct. 11, 2022

(65) Prior Publication Data

US 2024/0121477 A1　Apr. 11, 2024

(51) Int. Cl.
*H04N 21/472*　(2011.01)
*G06F 16/738*　(2019.01)
*H04N 21/45*　(2011.01)

(52) U.S. Cl.
CPC ..... *H04N 21/47205* (2013.01); *G06F 16/738* (2019.01); *H04N 21/4532* (2013.01)

(58) Field of Classification Search
CPC ......... H04N 21/47205; H04N 21/4532; H04N 21/8541; G06F 16/738
See application file for complete search history.

(56) References Cited

U.S. PATENT DOCUMENTS

| | | | |
|---|---|---|---|
| 5,903,317 A | 5/1999 | Sharir | |
| 5,914,748 A | 6/1999 | Pulaski | |
| 7,046,732 B1 | 5/2006 | Slowe | |
| 7,360,230 B1 | 4/2008 | Paz | |
| 7,795,667 B2 | 9/2010 | Iguchi et al. | |
| 8,091,039 B2 | 1/2012 | Salvador | |
| 8,140,340 B2 | 3/2012 | Bhogal | |
| 9,747,371 B2 | 8/2017 | Bardwil | |

(Continued)

FOREIGN PATENT DOCUMENTS

| | | |
|---|---|---|
| WO | WO 2018/213481 | 11/2018 |
| WO | WO 2019/058111 | 3/2019 |

OTHER PUBLICATIONS

X-Ray: Benefits & How to Access X-Ray on Movies and Series https://www.amazon.com/adlp/xray.

(Continued)

*Primary Examiner* — Nicholas T Corbo
(74) *Attorney, Agent, or Firm* — Farjami & Farjami LLP (57) ABSTRACT

A multi-variant content streaming system includes processing hardware and a system memory storing software code. The processing hardware is configured to execute the software code to stream primary content to a plurality of media players, and receive, from a first media player of the plurality of media players, first user interaction data of a first user interacting with the first media player with the primary content. The processing hardware is further configured to execute the software code to generate, using the first user interaction data, first variant content based on the primary content, and stream the first variant content to the first media player while continuing to stream the primary content to media players of the plurality of media players other than the first media player.

20 Claims, 7 Drawing Sheets

(56) References Cited

U.S. PATENT DOCUMENTS

| | | |
|---|---|---|
| 10,194,177 B1 | 1/2019 | Ashbacher |
| 10,271,077 B2 | 4/2019 | Shi |
| 10,924,823 B1 | 2/2021 | Binder |
| 11,206,441 B2 | 12/2021 | Navarre |
| 2002/0188943 A1 | 12/2002 | Freeman |
| 2003/0115220 A1 | 6/2003 | Chan |
| 2004/0133542 A1 | 7/2004 | Doerksen |
| 2006/0072815 A1 | 4/2006 | Wu |
| 2006/0153300 A1 | 7/2006 | Wang |
| 2006/0174264 A1 | 8/2006 | Candelore |
| 2007/0220429 A1 | 9/2007 | Kureshy |
| 2008/0033804 A1 | 2/2008 | McKenna |
| 2008/0034314 A1 | 2/2008 | Louch |
| 2008/0098031 A1 | 4/2008 | Ducharme |
| 2008/0144723 A1 | 6/2008 | Chen |
| 2008/0152006 A1 | 6/2008 | Chen |
| 2008/0215973 A1 | 9/2008 | Zalewski |
| 2008/0285339 A1 | 11/2008 | Barkley |
| 2009/0097548 A1 | 4/2009 | Karczewicz |
| 2009/0240736 A1 | 9/2009 | Crist |
| 2009/0276718 A1 | 11/2009 | Dawson |
| 2010/0082661 A1 | 4/2010 | Beaudreau |
| 2010/0162307 A1 | 6/2010 | Suh |
| 2010/0241507 A1 | 9/2010 | Quinn |
| 2010/0257550 A1 | 10/2010 | Slothouber |
| 2011/0202562 A1* | 8/2011 | Bloch .................. G06F 16/745 |
| | | 707/E17.014 |
| 2011/0234615 A1 | 9/2011 | Hanson |
| 2013/0094830 A1 | 4/2013 | Stone |
| 2013/0202150 A1 | 8/2013 | Sinha |
| 2014/0289627 A1 | 9/2014 | Brockmann |
| 2015/0032900 A1 | 1/2015 | Shanson |
| 2016/0241913 A1* | 8/2016 | Bhandari ............... H04L 65/60 |
| 2017/0280175 A1 | 9/2017 | Fein |
| 2017/0366867 A1 | 12/2017 | Davies |
| 2018/0131975 A1 | 5/2018 | Badawiych |
| 2018/0343489 A1 | 11/2018 | Loheide |
| 2019/0028758 A1 | 1/2019 | Talvensaari |
| 2019/0046879 A1 | 2/2019 | Halper |
| 2020/0066304 A1 | 2/2020 | Chen |
| 2020/0366953 A1 | 11/2020 | Shusman |
| 2021/0067844 A1* | 3/2021 | Binder .................. H04L 65/70 |
| 2021/0144416 A1 | 5/2021 | Navarre |
| 2022/0345794 A1 | 10/2022 | Parikh |

OTHER PUBLICATIONS

Extended European Search Report dated Mar. 5, 2024 for EP Application 23200328.5.

Max Bain, Arsha Nagrani, Andrew Brown, Andrew Zimmerman "Condensed Movies: Story Based Retreival with Contextual Embeddings" Asian Conference on Computer Vision 2020 21 Pages.

* cited by examiner

MULTI-VARIANT CONTENT STREAMING

BACKGROUND

When providing interactive entertainment that empowers audience members to determine how the performance will evolve, production teams typically tally the responses of participating audience members and then proceed to serve a single linear storyline that uses data from an aggregate audience decision, such as a majority vote. For example, a baseline narrative could contain a story about a character following a path which comes to a fork. Audience members may engage with the storyline by deciding which of two paths the character should take. In a conventional approach, a majority vote would send the character down a single path and present that single outcome to all audience members regardless of their individual votes. Even in instances in which the aggregate vote is split evenly between the two paths, some tie-breaking mechanism is typically used to collapse the two potential alternatives into a single continuation path for the character. Unfortunately, however, the more compelling the performance and the more initially engaged audience members are with the development of the storyline, the more likely it is that such a binary outcome will alienate or at least undesirably disappoint those audience members who preferred the path not taken.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, when providing interactive entertainment that empowers audience members to determine how the performance will evolve, production teams typically tally the responses of participating audience members and then proceed to serve a single linear storyline that uses data from an aggregate audience decision, such as a majority vote. For example, a baseline narrative could contain a story about a character following a path which comes to a fork. In a conventional approach, a majority vote would send the character down a single path and present that single outcome to all audience members regardless of their individual votes, even in instances in which the aggregate vote is split evenly between the two paths. Unfortunately, however, the more compelling the performance and the more initially engaged audience members are with the development of the storyline, the more likely it is that such a binary outcome will alienate or at least undesirably disappoint those audience members who preferred the path not taken.

The present application discloses systems and methods providing multi-variant content streaming that address and overcome the deficiencies in the conventional art. By way of conceptual overview, by treating the provision of streaming content more like an interactive video game that remote audiences can participate in, live or pre-recorded linear video production can be reimagined to create rich new experiences that are advantageously more responsive to the preferences of individual audience members.

According to the present novel and inventive concepts, a primary content and a plurality of instances of variant content can be generated to serve the audience members (hereinafter "users") identified as belonging to different choice groups based on their interactive behavior. To that end, the present application discloses systems and methods providing a scalable entertainment experience in which remote users receive a personalized entertainment experience despite the fact that the ratio of each instance of the variant content to users is typically one-to-many rather than one-to-one. Moreover, according to the concepts disclosed herein, it is server-side resources rather than client-side resources that act as the switcher for directing the variant content to users, depending on the user's series of actions or their specific action or actions at a decision point or interaction point (hereinafter "interaction point").

Additionally, in some implementations, non-interactive passive users (i.e., non-voting users) can participate in the variant content on the sidelines by contributing engagement that does not affect the plot, and which may be merged into some or all instances of the variant content. For instance, any number of non-interactive users could appear as live participants in the variant content using a virtual engagement tool such as a virtual reality (VR) headset or interactive web browser and be depicted as part of an audience (e.g., a crowd watching a race or a sporting event). The variant content delivered to a particular user could be tailored by the user to apply a filter to the primary content or to follow desired plot outcomes. For instance, in a sporting event, a group of users might desire to view a feed that only shows fans of their preferred team while blocking fans of the opposing teams, and/or to follow narrative paths that highlight activity by their preferred team. Moreover, in some implementations, the systems and methods disclosed by the present application may be substantially or fully automated.

It is noted that, as defined in the present application, the terms "automation," "automated," and "automating" refer to systems and processes that do not require the participation of a human user, such as a human system administrator. For example, although in some implementations a human production manager may review the performance of the systems and methods disclosed herein, and, in some cases may adjust their performance over time, that human involvement is optional. Thus, in some implementations, the processes described in the present application may be performed under the control of hardware processing components of the disclosed systems. It is further noted that, as defined in the present application, "streaming" refers to the delivery of any type of communication signals usable for broadcast or transmission over Internet Protocol (IP).

Figure 1:
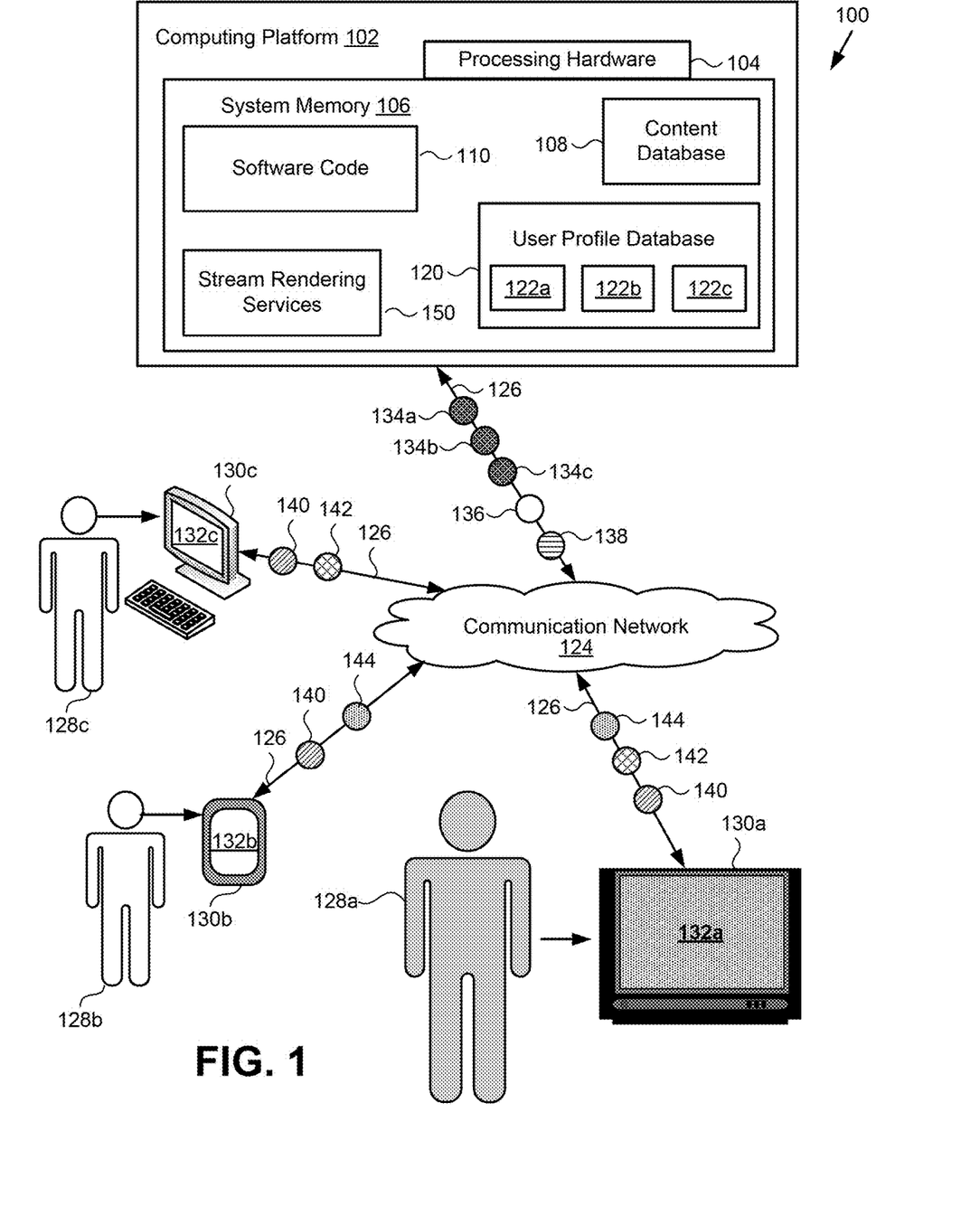
FIG. 1 shows a diagram of an exemplary multi-variant content streaming system, according to one implementation.

FIG. 1 shows a diagram of exemplary multi-variant content streaming system 100, according to one implementation. Multi-variant content streaming system 100 includes computing platform 102 having processing hardware 104 and system memory 106 implemented as a computer-readable non-transitory storage medium. According to the exemplary implementation shown in FIG. 1, system memory 106 stores software code 110, content database 108, stream rendering services 150, and user profile database 120 including user profiles 122a, 122b, and 122c (hereinafter "user profiles 122a-122c"). It is noted that, as used herein, the expression stream rendering services refers to video encoding and hosting services providing video transcoding and delivery.

In addition, FIG. 1 shows media players 130a, 130b, and 130c (hereinafter "media players 130a-130c") utilized by respective users 128a, 128b, and 128c (hereinafter "user 128a-128c") associated with respective user profiles 122a-122c. As shown in FIG. 1, media players 130a-130c are in communication with computing platform 102 via communication network 124 and network communication links 126. Also shown in FIG. 1 are primary content 140 provided by multi-variant content streaming system 100, interaction data 134a, 134b, and 134c received from user 128a, interaction data 136 received from user 128b, interaction data 138 received from user 128c, first variant content 142 provided by multi-variant content streaming system 100, second variant content 144 also provided by multi-variant content streaming system 100, and displays 132a, 132b, and 132c (hereinafter "displays 132a-132c") of respective media players 130a-130c.

According to the implementation shown in FIG. 1, multi-variant content streaming system 100 streams primary content 140 to each of media players 130a-130c, and may receive interaction data 134a, 134b, 134c, 136, and 138 from media players 130a-130c via communication network 124 and network communication links 126. In response to receiving interaction data 134a, 134b, 134c, 136, and 138 from media players 130a-130c, multi-variant content streaming system 100 generates first variant content 142 and second variant content 144, and variously streams one of primary content 140, first variant content 142, or second variant content 144 to each of media players 130a-130c as described in detail below by reference to FIGS. 4A, 4B, 4C, and 4D.

Primary content 140 and first and second variant content 142 and 144 may be or include content of a variety of different types. For example, primary content 140 and first and second variant content 142 and 144 may be or include audio-video content having both audio and video components, may include video unaccompanied by audio, or may include audio unaccompanied by video. In addition, or alternatively, in some implementations, primary content 140 and first and second variant content 142 and 144 may be or include digital representations of persons, fictional characters, locations, objects, and identifiers such as brands and logos, for example, which populate a VR, augmented reality (AR), or mixed reality (MR) environment. Such content may depict virtual worlds that can be experienced by any number of users synchronously and persistently, while providing continuity of data such as personal identity, user history, entitlements, possessions, payments, and the like. Moreover, in some implementations, the content provided by primary content 140 and first and second variant content 142 and 144 may be a hybrid of traditional audio-video and fully immersive VR/AR/MR experiences, such as interactive video.

With respect to the representation of system 100 shown in FIG. 1, it is noted that although software code 110, content database 108, stream rendering services 150, and user profile database 120 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110, content database 108, stream rendering services 150, and user profile database 120 as being mutually co-located in system memory 106, that representation is also merely provided as an aid to conceptual clarity. More generally, multi-variant content streaming system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within multi-variant content streaming system 100. Thus, it is to be understood that software code 110, content database 108, stream rendering services 150, and user profile database 120 may be stored remotely from one another within the distributed memory resources of multi-variant content streaming system 100.

Furthermore, in some implementations, one or more of content database 108, stream rendering services 150, and user profile database 120 may not be included in multi-variant content streaming system 100, but may rather be one or more remote resources communicatively coupled to multi-variant content streaming system 100 by communication network 124 and network communication links 126. By way of example, in some implementations, stream rendering services 150 may be a video transcoding application internal to multi-variant content streaming system 100, such as Fast Forward Motion Picture Experts Group (FFmpeg) for instance. Alternatively, stream rendering services 150 may be an external transcoder, such as Elemental MediaLive® provided by Amazon Web Services (aws®).

Processing hardware 104 may include a plurality of hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, multi-variant content streaming system 100 may be implemented virtually, such as in a data center. For example, in some implementations, multi-variant content streaming system 100 may be implemented in software, or as virtual machines.

Although FIG. 1 depicts three media players 130a, 130b, and 130c in the interests conceptual clarity, it is noted that the plurality of media players receiving primary content 140 from multi-variant content streaming system 100 may include fewer than three media players, or more than three media players, such a hundreds, thousands, or millions of media players, for example. Moreover, although media players 130a, 130b, and 130c are shown respectively as a smart television (smart TV), a smartphone or tablet computer, and a desktop computer in FIG. 1, those representations are provided merely as examples as well. More generally, media players 130a-130c may be any suitable mobile or stationary computing devices or systems that implement data processing capabilities sufficient to provide a user interface, support connections to communication network 124, and implement the functionality ascribed to media players 130a-130b herein. In other implementations, any of media players 130a-130c may take the form of a laptop computer, smartwatch, or VR or AR device, for example.

With respect to displays 132a-132c of respective media players 130a-130c, displays 132a-132c may be physically integrated with respective media players 130a-130c, or may be communicatively coupled to but physically separate from respective media players 130a-130c. For example, where media players 130a-130c are implemented as smartphones, smart TVs, tablet computers, or VR or AR devices, displays 132a-132c will typically be integrated with respective media players 130a-130c. By contrast, where media players media players 130a-130c are implemented as desktop computers, respective displays 132a-132c may take the form of monitors separate from media players 130a-130c in the form of computer towers. Furthermore, displays 132a-132c may be implemented as liquid crystal displays (LCDs), light-emitting diode (LED) displays, organic light-emitting diode (OLED) displays, quantum dot (QD) displays, or any other suitable display screens that perform a physical transformation of signals to light.

Figure 2:
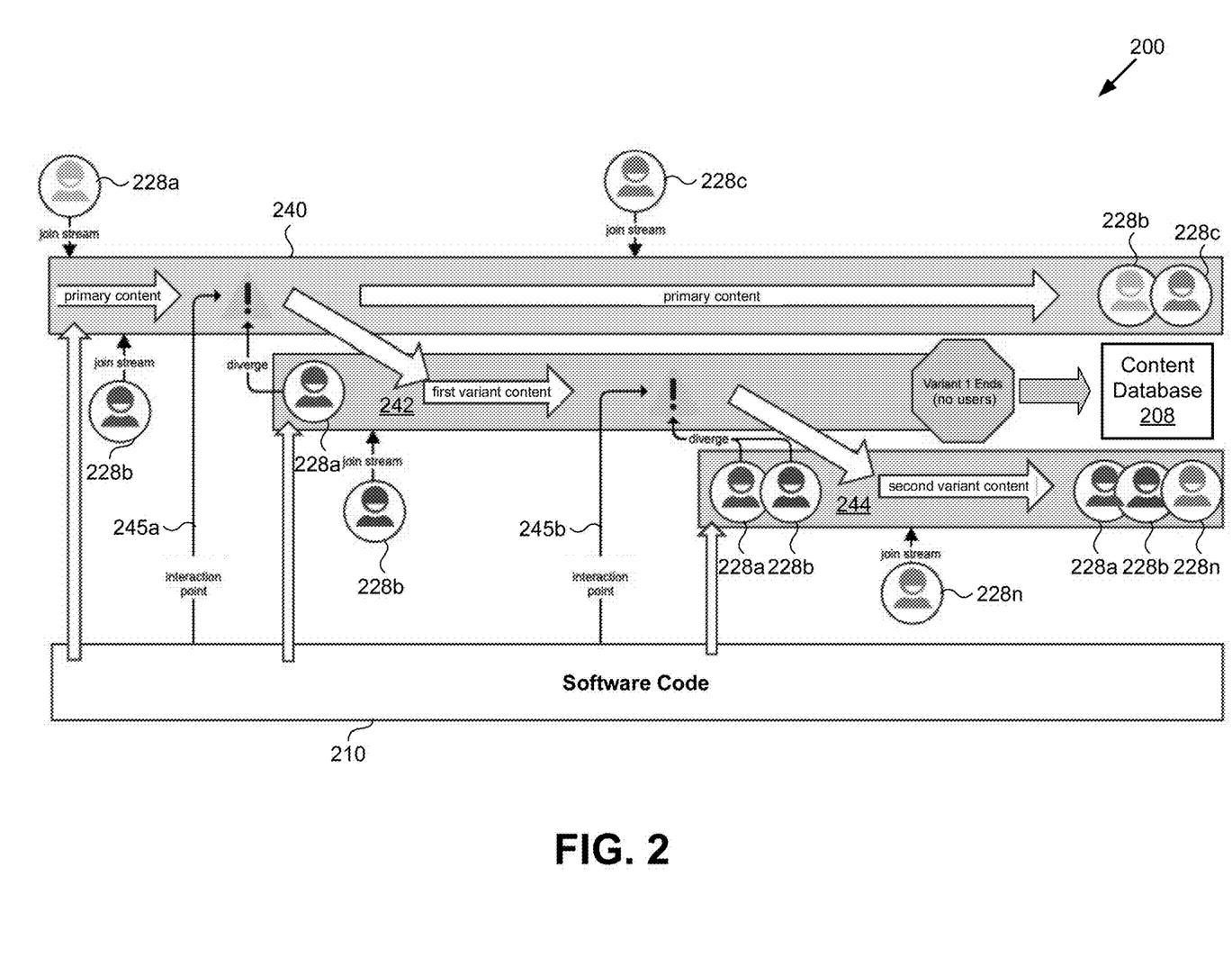
FIG. 2 shows a diagram depicting a plurality of users interacting with software code of the system of FIG. 1 to obtain primary content and first and second variant content, according to one implementation.

FIG. 2 shows diagram 200 depicting a plurality of users interacting with software code 210 to obtain primary content 240, first variant content 242 and second variant content 244, according to one implementation. In addition to software code 210, primary content 240, first variant content 242, and second variant content 244, FIG. 2 shows users 228a, 228b, and 228c (hereinafter "users 228a-228c"), other user or users 228n (hereinafter "other user(s) 228n"), interaction points 245a and 245b, and content database 208.

It is noted that software code 210, primary content 240, first variant content 242 and second variant content 244 correspond respectively in general to software code 110, primary content 140, first variant content 142, and second variant content 144, in FIG. 1. Thus, software code 110, primary content 140, first variant content 142 and second variant content 144 may share any of the characteristics attributed to respective software code 210, primary content 240, first variant content 242, and second variant content 244 by the present disclosure, and vice versa. Moreover, users 228a-228c and content database 208, in FIG. 2, correspond respectfully in general to users 128a-128c and content database 108, in FIG. 1. That is to say, users 128a-128c and content database 108 may share any of the characteristics attributed to respective users 228a-228c and content database 208 by the present disclosure, and vice versa.

As shown in FIG. 2, software code 210 streams primary content 240 that can be joined or acquired at various times by users 228a-228c. As further shown in FIG. 2, user 228a (hereinafter "first user 228a") interacts with primary content 240 at interaction point 245a, and in response to that interaction, software code 210 generates first variant content 242, based on primary content 240, and streams first variant content 242 to first user 228a in lieu of primary content 240 while continuing to stream primary content 240 to user 228b (hereinafter "second user 228b") and user 228c (hereinafter "third user 228c").

As also shown in FIG. 2, once streaming of first variant content 242 is initiated any other user, such as second user 228b, may abandon primary content 240 in favor of first variant content 242. For example, in some implementations software code 210 may inform all users receiving primary content 240, or any variant content, what variant content streams are presently active, as well as in some implementations, the comparative popularity of each active variant content stream among other users.

According to the exemplary implementation shown in FIG. 2, after second user 228b begins to receive first variant content 242, first user 228a and second user 228b interact with first variant content 242 at interaction 245b. In response to that interaction, software code 210 generates second variant content 244, based on one or both of primary content 240 and first variant content 242, and streams second variant content 244 to first user 228a and second user 228b in lieu of first variant content 242, while continuing to stream primary content 240 to third user 228.

It is noted that other user(s) 228n may join any active content stream (e.g., primary content 240 or any variant content) at any time during streaming of that active stream. In some implementations, a user joining an active stream will receive streaming content synchronously with content received by other users. For example, where second user 228b joins first variant content 242 at timestamp 00:06:30 relative to the generation of first variant content 242 in response to interaction by first user 228a with primary content 240, software code 210 may begin streaming first variant content 242 to second user 228b from timestamp 00:06:30. However, in other implementations, a user joining an active stream may receive streaming content asynchronously with content received by other users. For example, where second user 228b joins first variant content 242 at timestamp 00:06:30 relative to the generation of first variant content 242 in response to interaction by first user 228a with primary content 240, software code 210 may begin streaming first variant content 242 to second user 228b from timestamp 00:00:00 relative to the generation of first variant content 242, despite the fact that first user 228a is contemporaneously being streamed first variant content 242 at timestamp 00:06:30 relative to the generation of first variant content 242.

It is also noted that in use cases in which users have abandoned a variant content stream, that variant content stream may be terminated, as shown in FIG. 2 for first variant content 242 after abandonment of first variant content 242 in favor of second variant content by first user 228a and second user 228b. Terminating an abandoned variant content stream advantageously reduces the computing overhead imposed on multi-variant content streaming system 100, as well as advantageously reducing unnecessary network traffic. In some implementations, variant content that has been abandoned may be saved to content database 208, and may be re-used in the future in response to an interaction with primary content 240 by third user 228c or any of other user(s) 228n.

Figure 3:
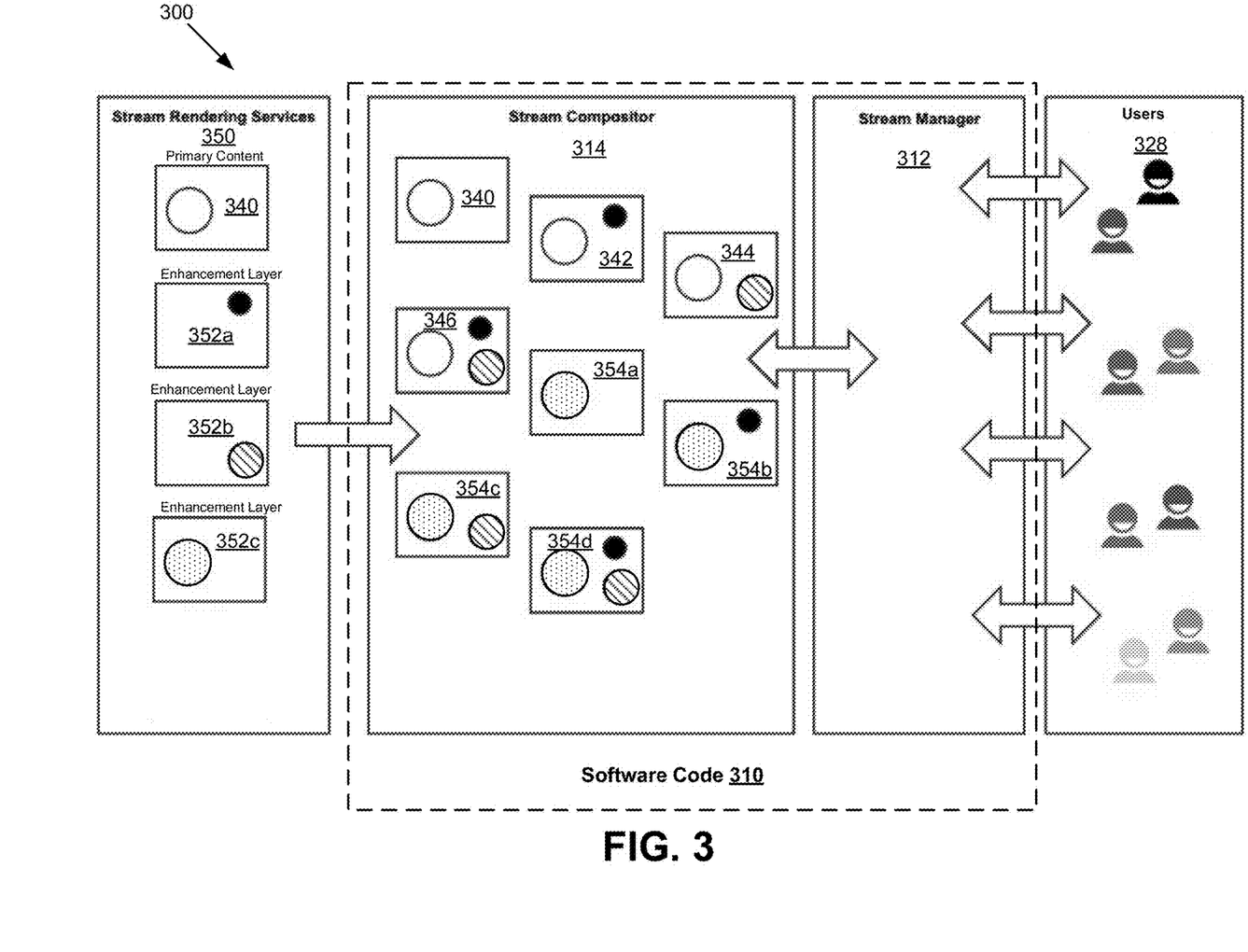
FIG. 3 shows a diagram providing a more detailed representation of an exemplary software code suitable for use by a multi-variant content streaming system, in combination with stream rendering services available to the system, according to one implementation.

FIG. 3 shows diagram 300 providing a more detailed representation of exemplary software code 310 suitable for use by multi-variant content streaming system 100, in FIG. 1, in combination with stream rendering services 350 providing primary content 340 and layers 352a, 352b, and 352c of enhancement content (hereinafter "enhancement layers") for use in generating variant content, according to one implementation. As shown in FIG. 3, software code 310 includes stream manager 312 and stream compositor 314. Also shown in FIG. 3 are primary content 340, first variant content 342, second variant content 344, third variant content 346, other variant contents 354a, 354b, 354c, and 354d (hereinafter "other variant contents 354a-354d"), and users 328.

Software code 310, primary content 340, first variant content 342, second variant content 344, and users 328 correspond respectively in general to software code 110/210, primary content 140/240, first variant content 142/242, second variant content 144/244, and users 128a-128c/228a-228c and 228n in FIGS. 1 and 2. Consequently, software code 110/210 primary content 140/240, first variant content 142/242, second variant content 144/244, and users 128a-128c/228a-228c and 228n may share any of the characteristics attributed to software code 310 primary content 340, first variant content 342, second variant content 344, and users 328 by the present disclosure, and vice versa. That is to say, although not shown in FIGS. 1 and 2, software code 110/210 may contain features corresponding respectively to stream manager 312 and stream compositor 314. Moreover, stream rendering services 350, in FIG. 3, corresponds in general to stream rendering services 150, in FIG. 1, and those corresponding features may share any of the characteristics attributed to either corresponding feature by the present disclosure.

According to the exemplary implementation shown in FIG. 3, and referring further to FIG. 1, stream manager 312 of software code 310 responds to interactions by users 128a-128c/328 with content provided by multi-variant content streaming system 100, e.g., interactions by users 128a-128c/328 with first primary content 140/340, first variant content 142/342, second variant content 144/344, and so forth. By way of example, interaction by user 128a (hereinafter "first user 128a") with primary content 140/340 may result in stream manager 312 of software code 110/310 instructing stream compositor 314 to obtain enhancement layer 352a from stream rendering services 150/350, and to generate first variant content 142/342 based on primary content 140/340 using enhancement layer 352a.

As further shown in FIG. 3, second variant content 344 may be generated by stream compositor 314 of software code 310 using primary content 340 and enhancement layer 352b, while third variant content 346 may be based on any of primary content 340 in combination with enhancement layers 352a and 352b, first variant content 342 in combination with enhancement layer 352b, or second variant content 344 in combination with enhancement layer 352a. Moreover, and as shown by other variant contents 354a-354d, in some instances, variant content provided by software code 310 may include content from one or more of enhancement layers 352a, 352b, or 352c, but may omit primary content 340.

It is noted that although FIG. 3 depicts first variant content 342, second variant content 344, third variant content and other variant contents 354a-354d as being composited from various enhancement layers 352a, 352b, and 352c, that representation is merely exemplary. In some implementations, a live event serving as primary content 340 may be captured by a plurality of cameras each capturing a different perspective of the live event. In those implementations, first variant content 342, second variant content 344, and third variant content 346 may simply be different camera feeds, from different perspectives (e.g., different camera locations and/or different camera angles), of the same live event.

Figure 4A:
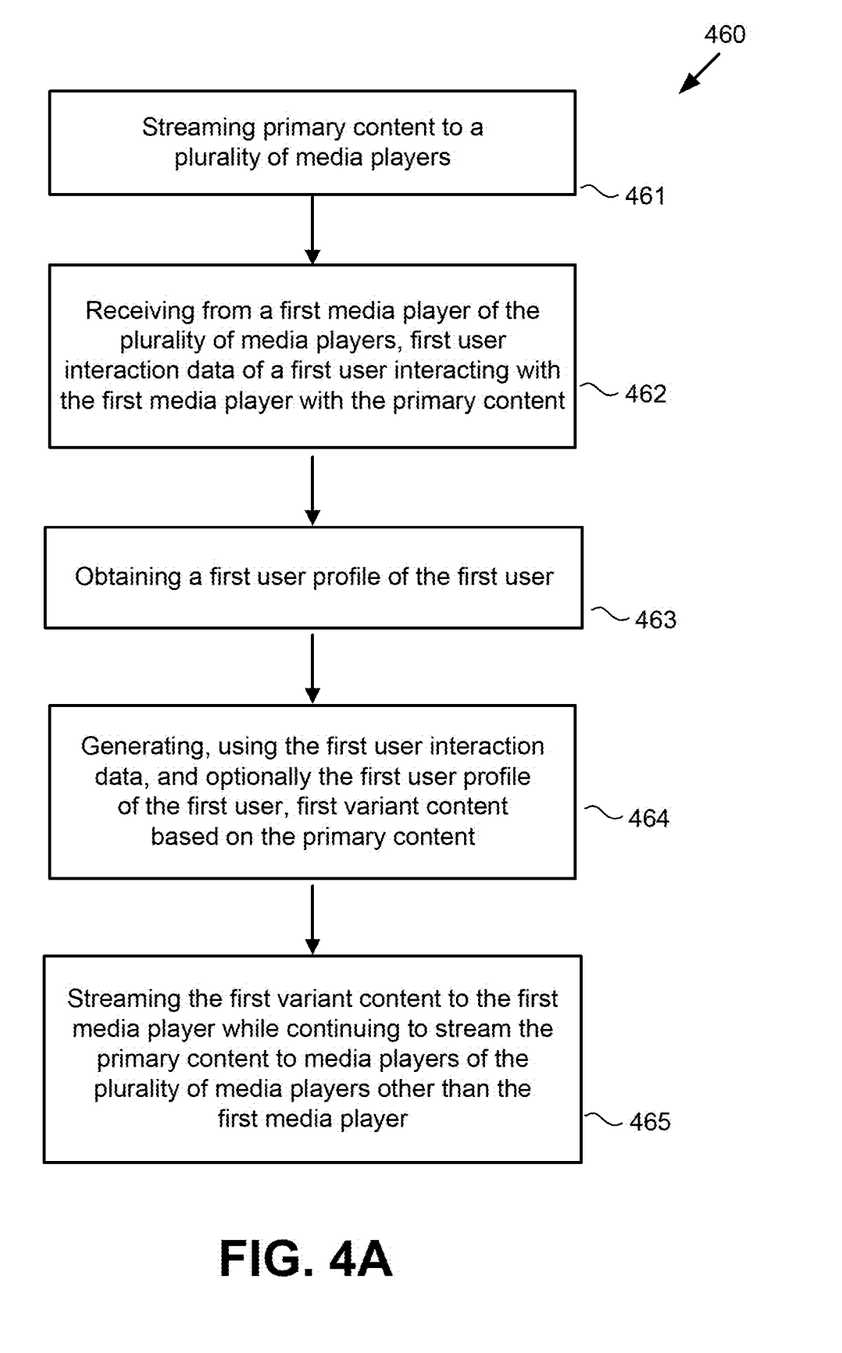
FIG. 4A shows a flowchart outlining an exemplary method for performing multi-variant content streaming, according to one implementation.

The functionality of multi-variant content streaming system 100, in FIG. 1, will be further described below with reference to FIGS. 4A, 4B, 4C, and 4D. FIG. 4A shows flowchart 460 outlining an exemplary method for performing multi-variant content streaming, according to one implementation, while FIG. 43 shows flowchart 470 including exemplary actions for extending the method outlined in FIG. 4A, according to one implementation. FIG. 4C shows flowchart 480 including other exemplary actions for extending the method outlined in FIG. 4A, according to another implementation, and FIG. 4D shows a continuation of flowchart 480 including exemplary actions for further extending the method outlined in FIGS. 4A and 4C, according to one implementation. With respect to the methods outlined by FIGS. 4A, 4B, 4C, and 4D, it is noted that certain details and features have been left out of flowcharts 460, 470, and 480 in order not to obscure the discussion of the inventive features in the present application.

Referring to FIG. 4A with further reference to FIG. 1, flowchart 460 includes streaming primary content 140 to a plurality of media players including media players 130a-130c (action 461). Primary content 140 may be streamed to media players 130a-130c, in action 461, by software code 110, executed by processing hardware 104 of muilti-variant content streaming system 100, and using communication network 124 and network communication links 126.

As noted above, primary content 140 may be or include content of a variety of different types. For example, primary content 140 may be or include audio-video content having both audio and video components, may include video unaccompanied by audio, or may include audio unaccompanied by video. In addition, or alternatively, in some implementations, primary content 140 may be or include digital representations of persons, fictional characters, locations, objects, and identifiers such as brands and logos, for example, which populate a VR, augmented reality AR, or mixed reality MR environment. Such content may depict virtual worlds that can be experienced by any number of users synchronously and persistently, while providing continuity of data such as personal identity, user history, entitlements, possessions, payments, and the like. Moreover, in some implementations, primary content 140 may be a hybrid of traditional audio-video and fully immersive VR/AR/MR experiences, such as interactive video.

Continuing to refer to FIGS. 4A and 1 in combination, flowchart 460 further includes receiving from a first media player (hereinafter "first media player 130*a*") of media players 130*a*-130*c*, first user interaction data (hereinafter "first user interaction data 134*a*") of first user 128*a* interacting with first media player 130*a* with primary content 140 (action 462). Action 462 may be performed by software code 110 of multi-variant content streaming system 100, executed by processing hardware 104. For example, first user interaction data 134*a* may include a selection by first user 128*a* of first media player 130*a* at an interaction point, such as a decision point, of primary content 140. Where primary content 140 includes a storyline, for instance, such an interaction point may be at a fork in the storyline, enabling first user 128*a* of first media player 130*a* to choose the continuation path preferred by first user 128*a*.

Alternatively, or in addition, first user interaction data 134*a* may identify a user initiated transition to a variant of primary content 140. For instance, where primary content 140 includes a live performance, such as a sporting event for example, first user interaction data 134*a* may identify a preference by first user 128*a* of first media player 130 for variant content focusing on a particular sports team or individual athlete.

Continuing to refer to FIGS. 4A and 1 in combination, in some implementations, as shown in FIG. 4A, flowchart 460 may optionally include obtaining user profile 122*a* of first user 128*a* (hereinafter "first user profile 122*a*") (action 463). First user profile 122*a* may include a content consumption history of first user 128*a*, as well as preferences of first user 128*a*, either affirmatively identified by first user 128*a* or learned inferentially by multi-variant content streaming system 100 using machine learning. In implementations in which optional action 463 is performed, first user profile 122*a* may be obtained from user profile database 120 by software code 110 of multi-variant content streaming system 100, executed by processing hardware 104. It is noted that although flowchart 460 shows optional action 463 as following action 462, that representation is merely by way of example. In various implementations, optional action 463 may follow action 462, may precede action 462, or may be performed in parallel with, i.e., contemporaneously with, action 462. Moreover, it is further noted that, in some implementations, optional action 463 may be performed in parallel with action 461.

Continuing to refer to FIGS. 4A and 1 in combination, flowchart 460 further includes generating, using first user interaction data 134*a* and optionally further using first user profile 122*a* of first user 128*a*, first variant content 142 based on primary content 140 (action 464). As noted above, action 463 is optional, and when included in the method outlined by flowchart 460, the order in which actions 462 and 463 are performed can vary. Thus, in some implementations, action 464 may follow action 462, while in other implementations action 464 may follow action 463.

With respect to generation of first variant content 142, it is noted that as described above by reference to FIG. 3, in some use cases, first variant content 142/342 may include primary content 140/340 enhanced by one or more of enhancement layers 352*a*, 352*b*, or 352*c*. By way of example, primary content 140/340 may be a live performance and generating first variant content 142/342 in action 464 may include compositing primary content 140/340 with an enhancement content layer including one or more features supplementing the live performance. As a specific example of the foregoing, where primary content 140/340 is a live broadcast of a sporting event, and one or more of first user interaction data 134*a* or first user profile 122*a* of identifies a particular team or athlete as being favored by first user 128*a*, first variant content 142/342 may include primary content 140/340 partly overlaid by fantasy sports data or other statistics relevant to the favored team or athlete.

Alternatively, and as further shown in FIG. 3, in some use cases, variant content, such as other variant contents 354*a*-354*d*, may be based on primary content 140/340 but may not include primary content 140/340 per se. For example, where primary content 140/340 has a primary storyline, generating first variant content 142/342 may include bifurcating the primary storyline to provide a first variant storyline.

As noted above, like primary content 140, first variant content 142 may be or include content of a variety of different types. For example, first variant content 142 may be or include audio-video content having both audio and video components, may include video unaccompanied by audio, or may include audio unaccompanied by video. In addition, or alternatively, in some implementations, first variant content 142 may be or include digital representations of persons, fictional characters, locations, objects, and identifiers such as brands and logos, for example, which populate a VR, augmented reality AR, or mixed reality MR environment. Such content may depict virtual worlds that can be experienced by any number of users synchronously and persistently, while providing continuity of data such as personal identity, user history, entitlements, possessions, payments, and the like. Moreover, in some implementations, first variant content 142 may be a hybrid of traditional audio-video and fully immersive VR/AR/MR experiences, such as interactive video.

Referring to FIGS. 4A and 1 in combination, flowchart 460 further includes streaming first variant content 142 to first media player 130*a* while continuing to stream primary content 140 to media players 130*b* and 130*c* (i.e., media players other than first media player 130*a*) (action 465). First variant content 142 may be streamed to first media player 130*a*, and primary content 140 may continue to be streamed to media players 130*b* and 130*c*, in action 465, by software code 110, executed by processing hardware 104 of multi-variant content streaming system 100, and using communication network 124 and network communication links 126.

Figure 4B:
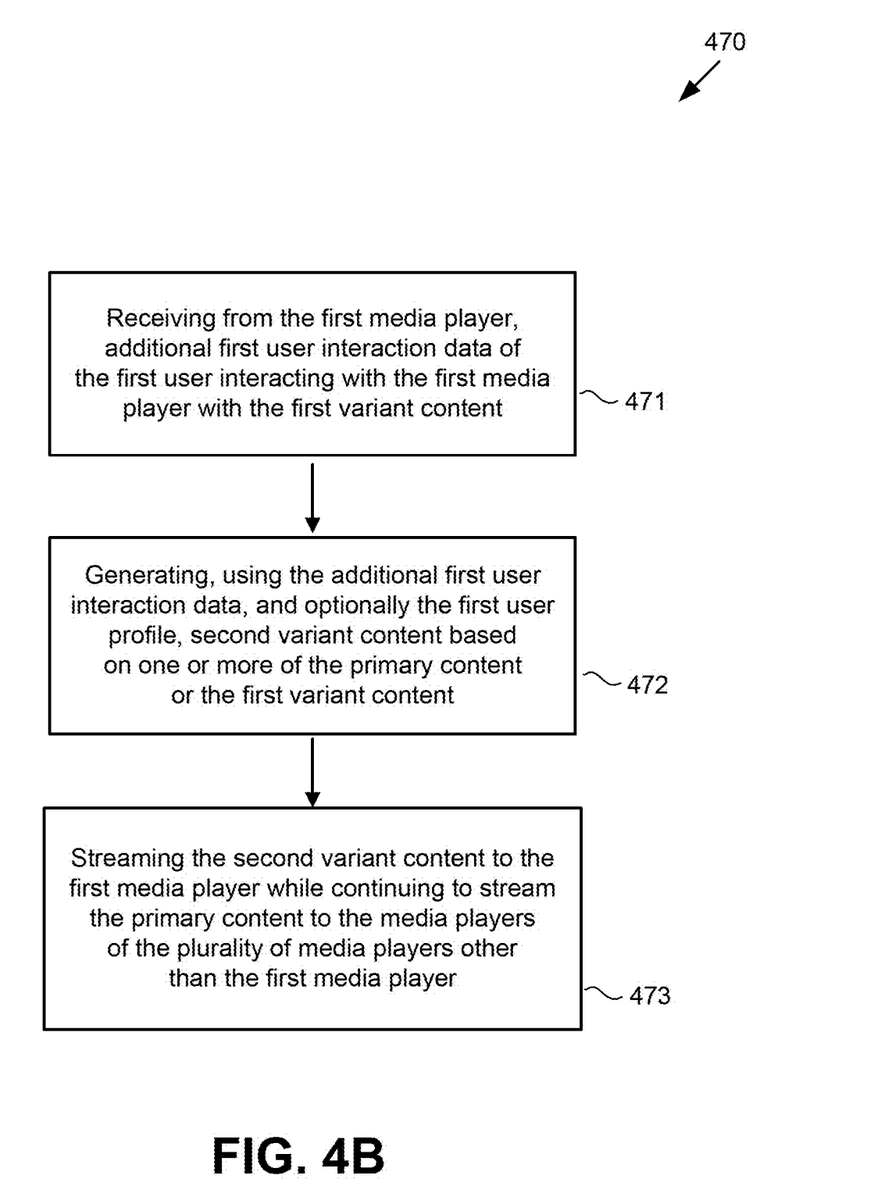
FIG. 4B shows a flowchart including exemplary actions for extending the method outlined in FIG. 4A, according to one implementation.
Figure 4C:
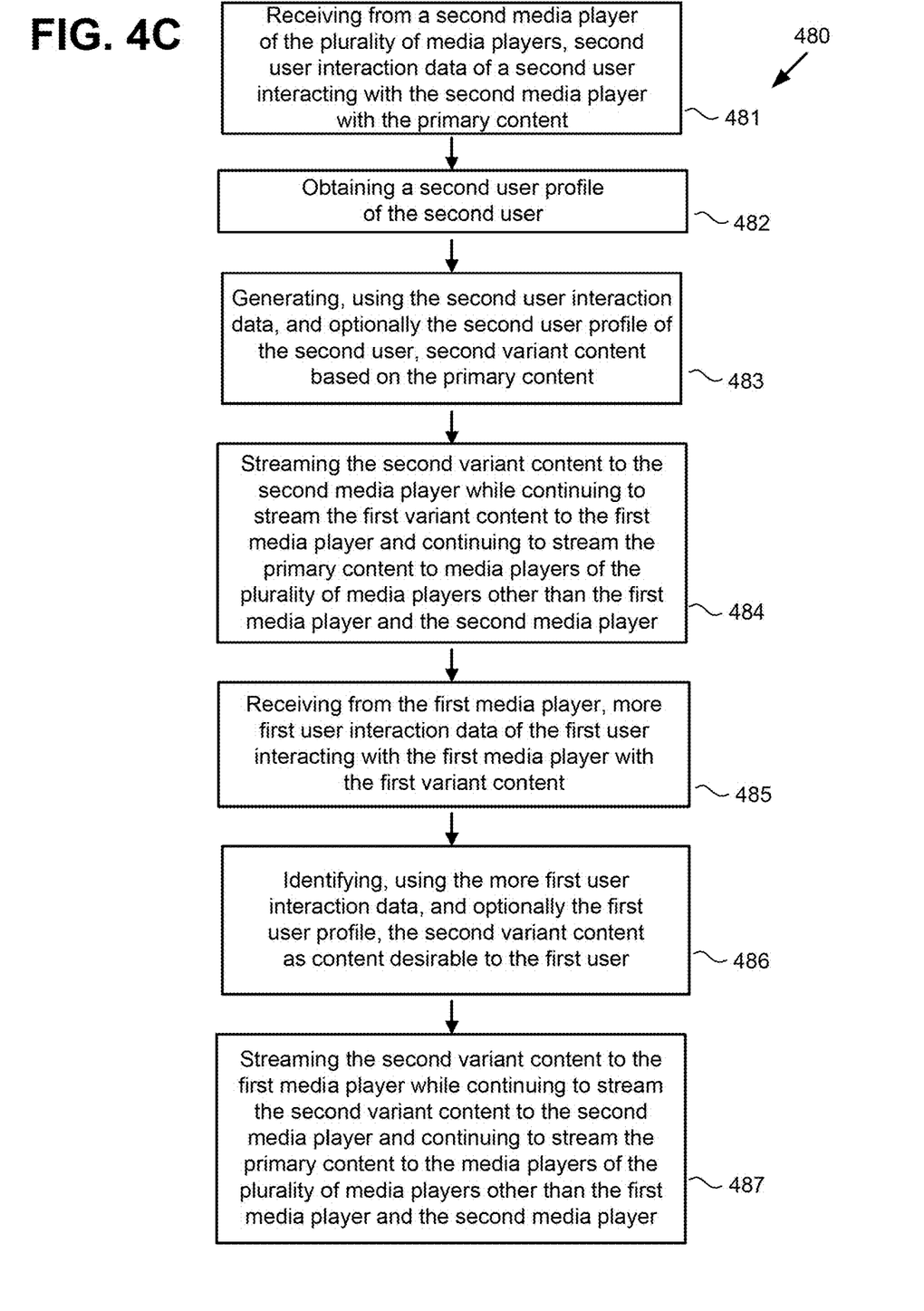
FIG. 4C shows a flowchart including exemplary actions for extending the method outlined in FIG. 4A, according to another implementation.
Figure 4D:
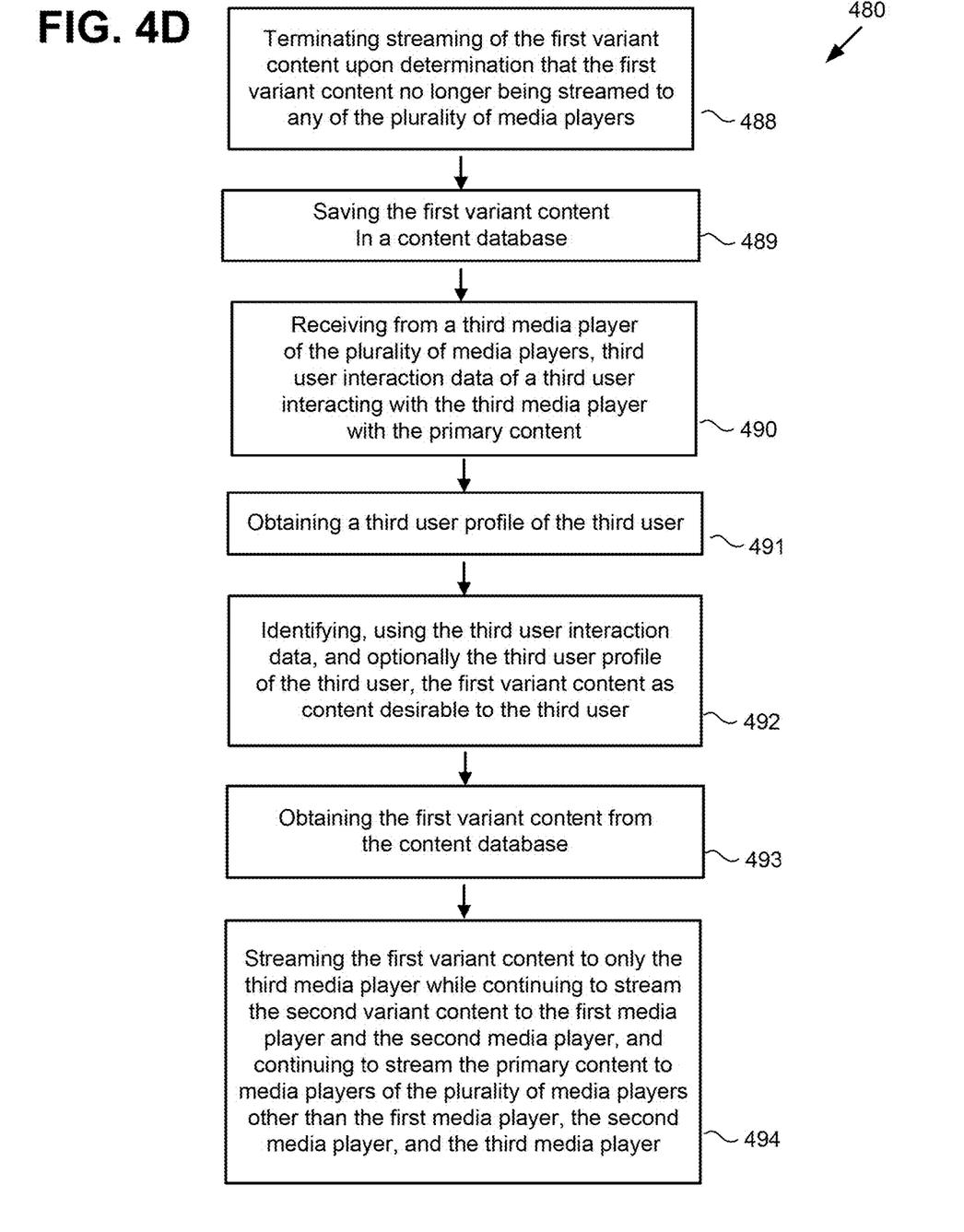
FIG. 4D shows a flowchart including exemplary actions for further extending the method outlined in FIGS. 4A and 4C, according to one implementation.

FIG. 4B shows flowchart 470 including exemplary actions for extending the method outlined in FIG. 4A, according to one implementation. Referring to FIG. 4B with further reference to FIG. 1, flowchart 470 includes receiving from the first media player, interaction data 134*b* (hereinafter "additional first user interaction data 134*b*") of first user 128*a* interacting with first media player 130*a* with first variant content 142 (action 471). Action 471 may be performed by software code 110 of multi-variant content streaming system 100, executed by processing hardware 104. For example, additional first user interaction data 134*b* may include a selection by first user 128*a* of first media player 130*a* at an interaction point, such as a decision point, of primary content 140. Alternatively, or in addition, additional first user interaction data 134*b* may identify a user initiated transition to another variant of primary content 140.

By way of example, where primary content 140 includes live election coverage, first user interaction data 134*a* may have expressed a preference by first user 128*a* of coverage of election results for one political party (Party A) to the exclusion of those of another party (Party B). In such a use case, first variant content 142 may include nationwide election results for Party A while omitting Party B elections results. First user 128*a* may subsequently provide additional first user interaction data 134*b* identifying interest by first user 128*a* in local election results for both Party A and Party B to the exclusion of other national election results.

Continuing to refer to FIGS. 4B and 1 in combination, flowchart 470 further includes generating, using additional first user interaction data 134*b* and optionally further using first user profile 122*a* of first user 128*a*, second variant content 144 based on primary content 140 (action 473). Generation of second variant content 144 may be performed by software code 110 of multi-variant content streaming system 100, executed by processing hardware 104, in a manner analogous to that described above by reference to action 464.

As noted above, like primary content 140 and first variant content 142, second variant content 144 may be or include content of a variety of different types. For example, second variant content 144 may be or include audio-video content having both audio and video components, may include video unaccompanied by audio, or may include audio unaccompanied by video. In addition, or alternatively, in some implementations, second variant content 144 may be or include digital representations of persons, fictional characters, locations, objects, and identifiers such as brands and logos, for example, which populate a VR, augmented reality AR, or mixed reality MR environment. Such content may depict virtual worlds that can be experienced by any number of users synchronously and persistently, while providing continuity of data such as personal identity, user history, entitlements, possessions, payments, and the like. Moreover, in some implementations, second variant content 144 may be a hybrid of traditional audio-video and fully immersive VR/AR/MR experiences, such as interactive video.

Continuing to refer to FIGS. 4B and 1 in combination, flowchart 470 further includes streaming second variant content 144 to first media player 130*a* while continuing to stream primary content 140 to media players 13*b* and 130*c* other than first media player 130*a* (action 473). Second variant content 144 may be streamed to media player 130*a*, and primary content 140 may continue to be streamed to media players 130*b* and 130*c*, in action 473, by software code 110, executed by processing hardware 104 of multi-variant content streaming system 100, and using communication network 124 and network communication links 126.

FIG. 4C shows flowchart 480 including other exemplary actions for extending the method outlined in FIG. 4A, according to another implementation. Referring to FIGS. 4C and 1 in combination, flowchart 480 includes receiving from a second media player (hereinafter "second media player 130*b*") of media players 130*a*-130*c*, interaction data 136 (hereinafter "second user interaction data 136") of user 128*b* (hereinafter "second user 128*b*") interacting with media player 130*b* (hereinafter "second media player 130*b*") with primary content 140 (action 481). Action 481 may be performed by software code 110 of multi-variant content streaming system 100, executed by processing hardware 104. For example, second interaction data 136 may include a selection by second user 128*b* of second media player 130*b* at an interaction point, such as a decision point, of primary content 140. Alternatively, or in addition, second interaction data 136 may identify a user initiated transition to a variant of primary content 140.

Continuing to refer to FIGS. 4C and 1 in combination, in some implementations, as shown in FIG. 4C, flowchart 480 may optionally include obtaining user profile 122*b* of second user 128*b* (hereinafter "second user profile 122*b*") (action 482). Second user profile 122*b* of may include a content consumption history of second user 128*b*, as well as preferences of second user 128*b*, either affirmatively identified by second user 128*b* or learned inferentially by multi-variant content streaming system 100 using machine learning. In implementations in which optional action 482 is performed, second user profile 122*b* may be obtained from user profile database 120 by software code 110 of multi-variant content streaming system 100, executed by processing hardware 104. It is noted that although flowchart 480 shows optional action 482 as following action 481, that representation is merely by way of example. In various implementations, optional action 482 may follow action 481, may precede action 481, may precede any of actions 462 through 465 outlined in FIG. 4A, or may be performed in parallel with, i.e., contemporaneously with, action 481 or any of actions 462 through 465. Moreover, it is further noted that, in some implementations, optional action 482 in FIG. 4C may be performed in parallel with action 461 in FIG. 4A.

Continuing to refer to FIGS. 4C and 1 in combination, flowchart 480 further includes generating, using second interaction data 136 and optionally further using second user profile 122*b* of second user 128*b*, second variant content 144 based on primary content 140 (action 483). Generation of second variant content 144 may be performed by software code 110 of multi-variant content streaming system 100, executed by processing hardware 104, in a manner analogous to that described above by reference to action 464.

As noted above, action 482 is optional, and when included in the method outlined by flowchart 480, the order in which actions 481 and 482 are performed can vary. Thus, in some implementations, action 483 may follow action 481, while in other implementations action 483 may follow action 48. With respect to generation of second variant content 144, it is noted that as described above by reference to FIG. 3, in some use cases second variant content 144/344 may include primary content 140/340 enhanced by one or more of enhancement layers 352*a*, 352*b*, or 352*c*.

Continuing to refer to FIGS. 4C and 1 in combination, flowchart 480 further includes streaming second variant content 144 to second media player 130*b* while continuing to stream first variant content 142 to first media player 130*a* and continuing to stream primary content 140 to media player 130*c* (i.e., a media player other than first media player 130*a* and second media player 130*b*) (action 484). First variant content 142 may be streamed to media player 130*a*, second variant content 144 may be streamed to second media player 130*b*, and primary content 140 may continue to be streamed to media player 130*c*, in action 484, by software code 110, executed by processing hardware 104 of multi-variant content streaming system 100, and using communication network 124 and network communication links 126.

Continuing to refer to FIGS. 4C and 1 in combination, flowchart 480 includes receiving from first media player 130*a*, interaction data 134*c* (hereinafter "more first user interaction data 134*c*") of first user 128*a* interacting with first media player 130*a* with first variant content 142 (action 485). Action 485 may be performed by software code 110 of multi-variant content streaming system 100, executed by processing hardware 104. For example, more first user interaction data 134c may include a selection by first user 128a of first media player 130a at an interaction point, such as a decision point, of first variant content 142. Alternatively, or in addition, more first user interaction data 134c may identify a user initiated transition to another variant of primary content 140.

Continuing to refer to FIGS. 4C and 1 in combination, flowchart 480 further includes identifying, using more first user interaction data 134c and optionally further using first user profile 122a, second variant content 144 as content desirable to first user 128a of first media player 130a (action 486). As stated above, in some instances, more first user interaction data 134c may identify a user initiated transition to another variant of primary content 140. In those use cases more first user interaction data 134c may identify second variant content 144 as desirable to first user 128a and may cause the transition from first variant content 142 to second variant content 144 for first user 128a to be initiated. Alternatively, similarity between a storyline of second variant content 144 and a change in storyline of first variant content 142 due to more first user interaction data 134c may indicate that second variant content would be desirable to first user 128a. In addition, or as yet another alternative, similarities between second variant content 144 and the content consumption patterns revealed by first user profile 122a may indicate that second variant content 144 would be desirable to first user 128a. Identification of second variant content 144 as desirable to first user 128a may be perforated by software code 110 of multi-variant content streaming system 100, executed by processing hardware 104.

Continuing to refer to FIGS. 4C and 1 in combination, flowchart 480 further includes streaming second variant content 144 to first media player 130a while continuing to stream second variant content 144 to second media player 130b and continuing to stream primary content 140 to media player 130c (i.e., a media player other than first media player 130a and second media player 130b) (action 487). Second variant content 144 may be streamed to first and second media players 130a and 130b, and primary content 140 may continue to be streamed to media player 130c, in action 487, by software code 110, executed by processing hardware 104 of multi-variant content streaming system 100, and using communication network 124 and network communication links 126.

By analogy to the description provided above with reference to FIG. 2, in some use cases, first user 128a may receive second variant content 144 synchronously with second user 128b. For example, where first user 128a begins receiving second variant content 144 at timestamp 00:06:30 relative to the generation of second variant content 144 in response to second interaction data 136 received from second user 128b, software code 110 may begin streaming second variant content 144 to first user 128a from timestamp 00:06:30. However, in other implementations, first user 128a may receive second variant content 144 asynchronously with variant content 144 received by second user 128b. For example, where first user begins to receive second variant content 144 at timestamp 00:06:30 relative to the generation of second variant content 144 in response to second interaction data 136 received from second user 128b, software code 110 may begin streaming second variant content 144 to first user 128a from timestamp 00:00:00 despite the fact that second user 128 is contemporaneously being streamed second variant content 144 at timestamp 00:06:30.

FIG. 4D shows a continuation of flowchart 480 including exemplary actions for further extending the method outlined in FIGS. 4A and 4C, according to one implementation. Referring to FIGS. 4D and 1 in combination, flowchart 480 further includes terminating streaming of first variant content 142 upon determination that first variant content 142 is no longer being streamed to any of the plurality of media players (action 488). As noted above by reference to another exemplary use case shown and described by reference to FIG. 2, in use cases in which users have abandoned a variant content stream, that variant content stream may be terminated, as shown in FIG. 2 for first variant content 242 after abandonment of first variant content 242 in favor of second variant content by users 228a and 228b. In some implementations, and as further noted above by reference to FIG. 2, variant content that has been abandoned, such as first variant content 242, may be saved to content database 208 (action 489), and may be re-used in the future in response to an interaction with primary content 240 by third user 228c or any of other user(s) 228n. Actions 488 and 489 may be performed by software code of multi-variant content streaming system 100, executed by processing hardware 104.

Continuing to refer to FIGS. 4D and 1 in combination, flowchart 480 further includes receiving from a third media player (hereinafter "third media player 130c") of media players 130a-130c, interaction data 138 (hereinafter "third user interaction data 138") of user 128c (hereinafter "third user 128c") interacting with media player 130c (hereinafter "third media player 130c") with primary content 140 (action 490). Action 490 may be performed by software code 110 of multi-variant content streaming system 100, executed by processing hardware 104. For example, third user interaction data 138 may include a selection by third user 128c of third media player 130c at an interaction point, such as a decision point, of primary content 140. Alternatively, or in addition, third user interaction data 138 may identify a user initiated transition to a variant of primary content 140.

Continuing to refer to FIGS. 4D and 1 in combination, in some implementations, as shown in FIG. 4D, flowchart 480 may optionally include obtaining user profile 122c of third user 128c (hereinafter "third user profile 128c") (action 491). Third user profile 122c of may include a content consumption history of third user 128c, as well as preferences of third user 128c, either affirmatively identified by third user 128c or learned inferentially by multi-variant content streaming system 100 using machine learning. In implementations in which optional action 491 is performed, third user profile 122c may be obtained from user profile database 120 by software code 110 of multi-variant content streaming system 100, executed by processing hardware 104. It is noted that although flowchart 480 shows optional action 491 as following action 490, that representation is merely by way of example. In various implementations, optional action 491 may follow action 490, may precede action 490, may precede any of actions 462 through 465 outlined in FIG. 4A or actions 481 through 487 outlined in FIG. 4C, or may be performed in parallel with, i.e., contemporaneously with, action 490 or any of actions 462 through 465 or actions 481 through 487. Moreover, it is further noted that, in some implementations, optional action 491 in FIG. 4D may be performed in parallel with action 461 in FIG. 4A.

Continuing to refer to FIGS. 4D and 1 in combination, flowchart 480 further includes identifying, using third user interaction data 138 and optionally further using third user profile 122c of third user 128c, first variant content 142 as content desirable to third user 128c of third media player 130c (action 492). It is noted that third user interaction data 138 may identify a user initiated transition to another variant of primary content 140. In those use cases third user interaction data 138 may identify first variant content 142 as desirable to third user 128c and may cause the transition from primary content 140 to first variant content 142 for third user 128c to be initiated. Alternatively, similarity between a storyline of first variant content 142 and a change in storyline of primary content 140 due to third user interaction data 138 may indicate that first variant content would be desirable to third user 128c. In addition, or as Vet another alternative, similarities between first variant content 142 and the content consumption patterns revealed by third user profile 122c may indicate that first variant content 142 would be desirable to third user 128c. Identification of first variant content 142 as desirable to third user 128c may be performed by software code 110 of multi-variant content streaming system 100, executed by processing hardware 104. As noted above, action 491 is optional, and when included in the method outlined by flowchart 480, the order in which actions 490 and 491 are performed can vary. Thus, in some implementations, action 492 may follow action 490, while in other implementations action 492 may follow action 491.

Continuing to refer to FIGS. 4D and 1 in combination, flowchart 480 further includes obtaining first variant content 142 from content database 108 (action 493). First variant content 142 may be obtained from content database 108, in action 493, by software code 110, executed by processing hardware 104 of multi-variant content streaming system 100.

Continuing to refer to FIGS. 4D and 1 in combination, flowchart 480 further includes streaming first variant content 142 to only third media player 130c while continuing to stream second variant content 144 to first and second media players 130a and 130b, and continuing to stream primary content 140 to any others of the plurality of media players other than first media player 130a, second media player 130b, and third media player 130c (action 494). Second variant content 144 may continue to be streamed to first and second media players 130a and 130b, and first variant content may be streamed to third media player 130c, in action 494, by software code 110, executed by processing hardware 104 of multi-variant content streaming system 100, and using communication network 124 and network communication links 126.

With respect to the methods outlined by flowcharts 460, 470, and 480, it is noted that actions 461, 462, 464, and 465, or actions 461, 462, 463, 464, and 465 (hereinafter "actions 461-465"), or actions 461, 462, 464, 465, and actions 471, 472, and 473 (hereinafter "actions 471-473"), or actions 461-465 and actions 471-473, or actions 461, 462, 464, and 465, and actions 481, 483, 484, 485, 486, and 487, or actions 461-465 and actions 481, 483, 484, 485, 486, and 487, or actions 461, 462, 464, and 465, and actions 481, 482, 483, 484, 485, 486, and 487 (hereinafter "actions 481-487"), or actions 461-465 and actions 481-487, or actions 461, 462, 464, and 465, and actions 481, 483, 484, 485, 486, 487, 488, 489, 490, 492, 493, and 494, or actions 461-465 and actions 481, 483, 484, 485, 486, 487, 488, 489, 490, 492, 493, and 494, or actions 461, 462, 464, and 465, and actions 481, 482, 483, 484, 485, 486, 487, 488, 489, and 490 (hereinafter "actions 481-490") and actions 492, 493, and 494, or actions 461-465 and actions 481-490, and actions 492, 493, and 494, or actions 461, 462, 464, and 465, and actions 481, 483, 485, 486, 487, and actions 488, 489, 490, 491, 492, 493, and 494 (hereinafter "actions 488-494"), or actions 461, 462, 464, and 465, and actions 481-490, 491, 492, 493, and 494 (hereinafter "actions 481-494"), or actions 461-465 and actions 481, 483, 484, 485, 486, 487, 488, 489, 490, 491, 492, 493, and 494, or actions 461-465 and actions 481-494, may be performed as automated processes front which human involvement may be omitted.

Thus, the present application discloses systems and methods providing multi-variant content streaming. By treating the provision of streaming content more like an interactive video game that remote users can participate in, live or pre-recorded linear video production can be transformed into rich entertainment experiences that are advantageously more responsive to the preferences of individual audience members. The systems and methods disclosed by the present application advance the state-of-the-art by providing a scalable entertainment experience in which remote users receive a personalized entertainment experiences despite the fact that the ratio of each instance of the variant content to users is typically one-to-many rather than one-to-one. Moreover, according to the concepts disclosed herein, it is server-side resources rather than client-side resources that act as the switcher for directing the variant content to users, depending on the user's series of actions or their specific action or actions at an interaction point.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
processing hardware; and
a system memory storing a software code;
the processing hardware configured to execute the software code to:
stream a primary content to a plurality of media players including a first media player having a first user and a second media player having a second user;
receive from the first media player of the plurality of media players, first user interaction data of the first user interacting with the primary content;
generate, using the first user interaction data, a first variant content based on the primary content;
terminate streaming the primary content to the first media player in favor of starting to stream the generated first variant content to the first media player at a first timestamp of the generated first variant content while continuing to stream the primary content to media players of the plurality of media players other than the first media player;
receive from the second media player of the plurality of media players, second user interaction data of the second user interacting with the primary content;
identify, using the second user interaction data, the generated first variant content as content desirable to the second user; and
in response to identifying the generated first variant content, terminate streaming the primary content to the second media player in favor of starting to stream the generated first variant content to the second media player of the plurality of media players at a second timestamp of the generated first variant content different than the first timestamp.

2. The system of claim 1, wherein the processing hardware is further configured to execute the software code to:
obtain a first user profile of the first user;
wherein the first variant content is generated further using the first user profile.

3. The system of claim 1, wherein the processing hardware is further configured to execute the software code to:
receive from the first media player, additional first user interaction data of the first user interacting with the generated first variant content;
generate, using the additional first user interaction data, a second variant content based on at least one of the primary content or the generated first variant content; and
terminate streaming the generated first variant content to the first media player in favor of starting to stream the generated second variant content to the first media player while continuing to stream the generated first variant content to the second media player and the primary content to the media players of the plurality of media players other than the first media player and the second media player.

4. The system of claim 1, wherein the plurality of media players include a third media player having a third user, and wherein the processing hardware is further configured to execute the software code to:
receive from the third media player of the plurality of media players, third user interaction data of the third user interacting with the primary content;
generate, using the third user interaction data, a second variant content based on the primary content; and
stream the generated second variant content to the third media player while continuing to stream the generated first variant content to the first media player and the second media player, and continuing to stream the primary content to media players of the plurality of media players other than the first media player, the second media player and the third media player.

5. The system of claim 4, wherein the processing hardware is further configured to execute the software code to:
receive from the first media player, more first user interaction data of the first user interacting with the generated first variant content;
identify, using the more first user interaction data, the generated second variant content as content desirable to the first user; and
terminate streaming the generated first variant content to the first media player in favor of starting to stream the generated second variant content to the first media player while continuing to stream the generated first variant content to the second media player and the generated second variant content to the third media player and continuing to stream the primary content to the media players of the plurality of media players other than the first media player, the second media player and the third media player.

6. The system of claim 5, wherein the generated second variant content is streamed to the first media player and the third media player asynchronously.

7. The system of claim 1, wherein the processing hardware is further configured to execute the software code to:
terminate streaming of the generated first variant content upon determination that the generated first variant content is no longer being streamed to any of the plurality of media players; and
save the generated first variant content in a content database.

8. The system of claim 7, wherein the processing hardware is further configured to execute the software code to:
in response to identifying and prior to streaming the generated first variant content to the second media player, obtain the generated first variant content from the content database.

9. The system of claim 1, wherein generating the first variant content comprises compositing the primary content with an enhancement content layer including one or more features supplementing the primary content.

10. The system of claim 1, wherein the primary content comprises a primary storyline, and wherein generating the first variant content comprises bifurcating the primary storyline to provide a first variant storyline.

11. A method for use by a system including processing hardware and a system memory storing a software code, the method comprising:
streaming, by the software code executed by the processing hardware, a primary content to a plurality of media players including a first media player having a first user and a second media player having a second user;
receiving from the first media player of the plurality of media players, by the software code executed by the processing hardware, first user interaction data of the first user interacting with the primary content;
generating, by the software code executed by the processing hardware and using the first user interaction data, a first variant content based on the primary content;
terminating the streaming of the primary content to the first media player in favor of streaming, by the software code executed by the processing hardware, the generated first variant content to the first media player at a first timestamp of the generated first variant content while continuing to stream the primary content to media players of the plurality of media players other than the first media player;
receiving from the second media player of the plurality of media players, by the software code executed by the processing hardware, second user interaction data of the second user interacting with the primary content;
identifying, by the software code executed by the processing hardware using the second user interaction data, the generated first variant content as content desirable to the second user; and
in response to identifying the generated first variant content, terminating the streaming of the primary content to the second media player in favor of streaming, by the software code executed by the processing hardware, the generated first variant content to the second media player of the plurality of media players at a second timestamp of the generated first variant content different than the first timestamp.

12. The method of claim 11, further comprising:
obtaining, by the software code executed by the processing hardware, a first user profile of the first user;
wherein the first variant content is generated further using the first user profile.

13. The method of claim 11, further comprising:
receiving from the first media player, by the software code executed by the processing hardware, additional first user interaction data of the first user interacting with the generated first variant content;

generating, by the software code executed by the processing hardware and using the additional first user interaction data, a second variant content based on at least one of the primary content or the generated first variant content; and terminating the streaming of the generated first variant content to the first media player in favor of streaming, by the software code executed by the processing hardware, the generated second variant content to the first media player while continuing to stream the generated first variant content to the second media player and the primary content to the media players of the plurality of media players other than the first media player and the second media player.

14. The method of claim 11, wherein the plurality of media players include a third media player having a third user, and the method further comprising:

receiving from the third media player of the plurality of media players, by the software code executed by the processing hardware, third user interaction data of the third user interacting with the primary content;

generate, by the software code executed by the processing hardware and using the third user interaction data, a second variant content based on the primary content; and streaming, by the software code executed by the processing hardware, the generated second variant content to the third media player while continuing to stream the generated first variant content to the first media player and the second media player, and continuing to stream the primary content to media players of the plurality of media players other than the first media player, the second media player and the third media player.

15. The method of claim 14, further comprising:

receiving from the first media player, by the software code executed by the processing hardware, more first user interaction data of the first user interacting with the generated first variant content;

identifying, by the software code executed by the processing hardware and using the more first user interaction data, the generated second variant content as content desirable to the first user; and terminating the streaming of the generated first variant content to the first media player in favor of streaming, by the software code executed by the processing hardware, the generated second variant content to the first media player while continuing to stream the generated first variant content to the second media player and the generated second variant content to the third media player and continuing to stream the primary content to the media players of the plurality of media players other than the first media player, the second media player and the third media player.

16. The method of claim 15, wherein the generated second variant content is streamed to the first media player and the third media player asynchronously.

17. The method of claim 11, further comprising:

terminating, by the software code executed by the processing hardware, streaming of the generated first variant content upon determination that the first variant content is no longer being streamed to any of the plurality of media players; and saving, by the software code executed by the processing hardware, the generated first variant content in a content database.

18. The method of claim 17, further comprising:

in response to identifying and prior to streaming the generated first variant content to the second media player, obtaining, by the software code executed by the processing hardware, the generated first variant content from the content database.

19. The method of claim 11, wherein generating the first variant content comprises compositing the primary content with an enhancement content layer including one or more features supplementing the primary content.

20. The method of claim 11, wherein the primary content comprises a primary storyline, and wherein generating the first variant content comprises bifurcating the primary storyline to provide a first variant storyline.

* * * * *